UNITED STATES PATENT OFFICE.

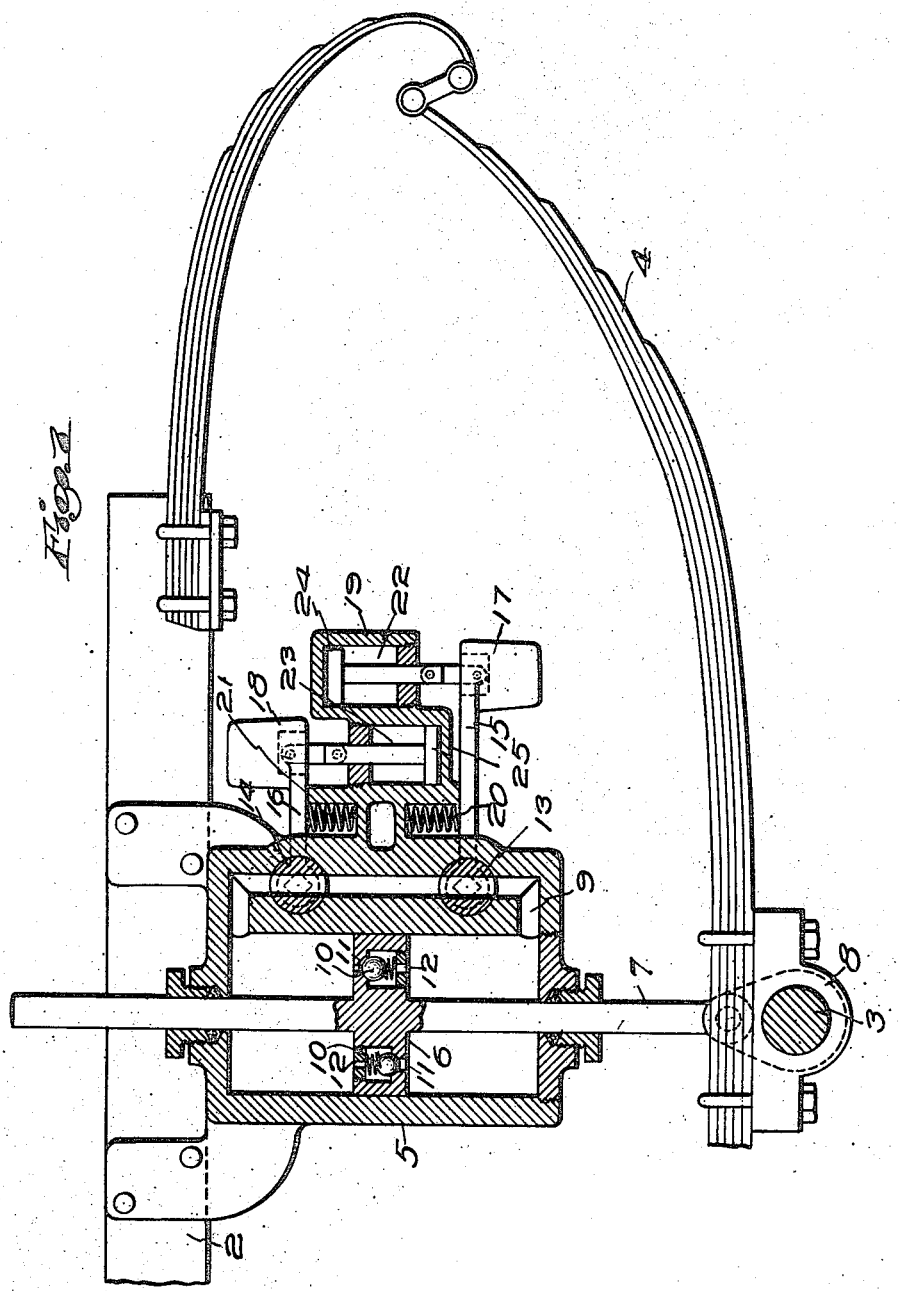

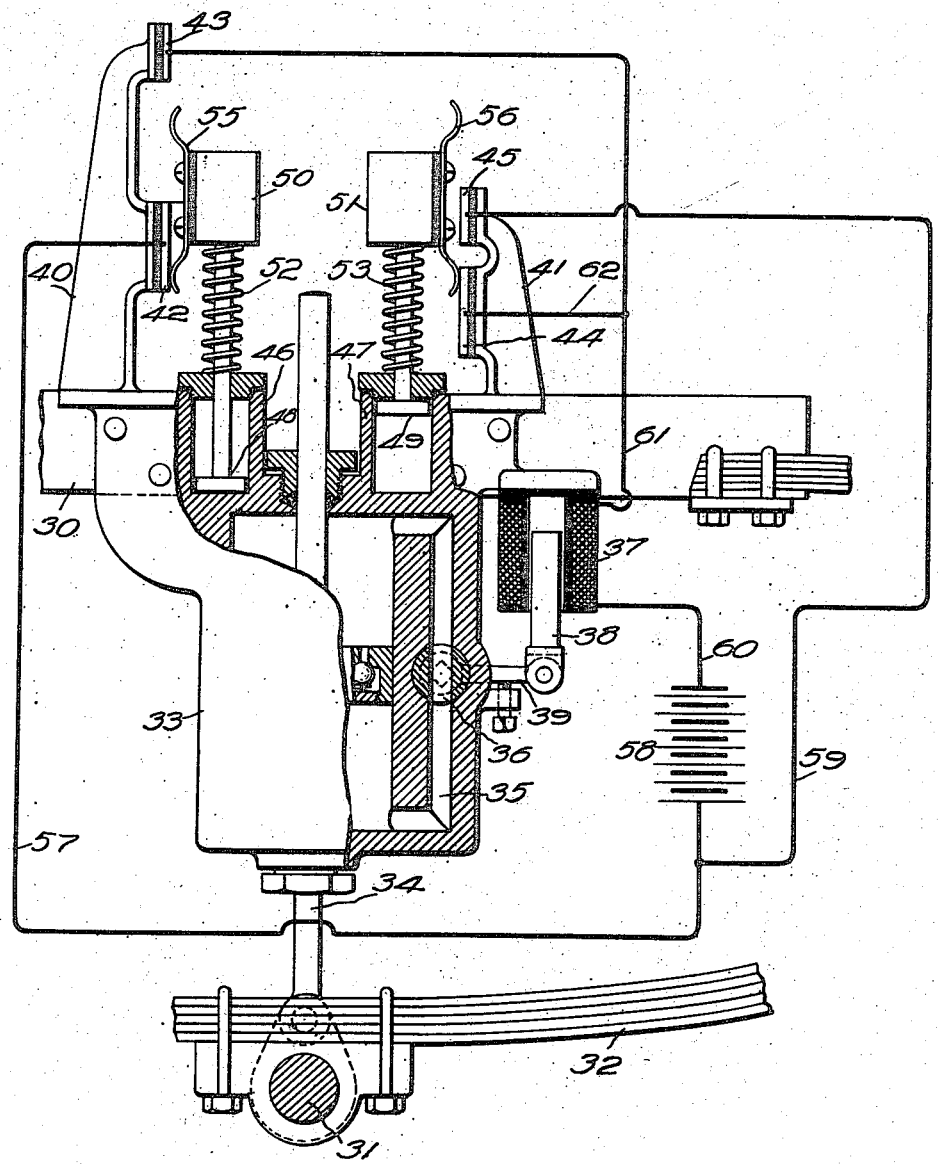

WILLARD T. SEARS, OF PHILADELPHIA, PENNSYLVANIA.

SHOCK-ABSORBER.

1,281,079.

Specification of Letters Patent.

Patented Oct. 8, 1918.

Application filed March 11, 1915. Serial No. 13,556.

*To all whom it may concern:*

Be it known that I, WILLARD T. SEARS, a citizen of the United States, residing at Philadelphia, in the county of Philadelphia and State of Pennsylvania, have invented certain new and useful Improvements in Shock-Absorbers, of which the following is a specification.

This invention relates to what are familiarly known as "shock-absorbers", the object of the invention being to provide a device of this character which is simple in construction and positive and certain in action.

In the drawings accompanying and forming part of the present specification, I have shown in detail two of the many different forms of embodiment of the invention, which to enable those skilled in the art to practice the same will be set forth fully in the following description. I do not restrict myself to this showing; I may depart therefrom in several respects within the scope of the invention defined by the claims following said description.

Referring to said drawings:

Figure 1 is a sectional elevation of one form of the shock absorber associated with a vehicle.

Fig. 2 is a practically similar view of a different form.

I do not restrict myself to the use of the invention in any particular field, it being capable of general application. It is common to provide vehicles, especially automobiles, with one or more shock absorbers, and my shock absorber is of particular advantage in this connection, involving two movable elements and checking means active preferably solely by the movement of one of said members. In the case of an automobile one of these members would be connected with the body of a vehicle for movement therewith and the other with an axle or other suitable part of the running gear, for movement therewith. In this particular use of the device, therefore, the checking means is rendered effective solely by the movement of the vehicle body, the axle being free to move up and down independently of the body to any extent within the limits of movement thereof without affecting the body. In the construction shown and hereinafter described when there is an abnormal movement of the body preferably either up or down, the checking or braking means is automatically put into action. As may be inferred, I mean by "abnormal" movement of the body any considerable or rapid movement thereof, for I prefer to permit normal or slow or limited movements of the body without causing the operation of the checking means. My shock absorber, therefore, differs radically from those in common use, in that it only acts to prevent disagreeable body movements, and in the case of an automobile, it would act to eliminate unpleasant shocks and jars to which the body thereof is ordinarily subjected. For slow movements in either direction of a movable member controlling the checking means, the shock absorber remains out of action unless the movements are of fairly considerable scope or amplitude or sudden or rapid in character, in which event the checking means of whatever type it may be is instantly automatically thrust into action and maintained in such relation as long as these abnormal movements continue.

In Fig. 1 the numeral 2 denotes the body or a portion of the body of a vehicle, and 3 the rear axle, springs as 4 serving their customary function, being disposed between the axle 3 or running gear and the body 2. I have shown fastened to and therefore movable with the body 2 the casing 5 which receives for sliding movement the plunger 6. As shown said casing and plunger consist of a cylinder and its piston and respectively constitute suitable elements or main members of my shock absorber. The stem 7 of the piston extends oppositely therefrom and through stuffing boxes in the two heads of the cylinder 5 the lower section of the stem being pivoted or otherwise suitably connected to the shackle 8 to which the spring 4 is connected. From this it will be evident that as the shackle is mounted on the axle 3, the piston is connected operatively with the axle, so that as the latter moves up and down similar movements will follow with respect to the stem 7 and piston 6. The cylinder 5 has a by-pass passage 9, the ends of which as shown open into the ends of the piston chamber of the cylinder 5.

The piston 6 has duplicate ports 10 therethrough, enlarged to receive the oppositely openable relief or check valves 11 backed up by coiled springs 12 which are for the purpose of preventing too great a pressure in the cylinder, when said by-pass passage 9 is closed by either of the valves hereinafter described. In the event that a pressure above a predetermined point developed in the cylinder, said valves 11 will be alternately opened as the piston reciprocates to thus prevent injury to the parts.

It will be assumed that the by-pass passage or channel 9 is unobstructed. In this event the axle 3 can move down and up. On such action of the axle the piston 6 is lowered and raised, causing the liquid in the cylinder 5 to move alternately in opposite directions through the by-pass passage 9. Said by-pass passage is intersected by chambers of duplicate construction to receive the controlling or checking valves 13 and 14, the openings or ports through which are during normal movements of the body 2 in full register with the by-pass passage 9. One of the valves as the valve 14, when the body 2 moves downwardly at other than a slow or normal rate, is closed to check the flow of the liquid and correspondingly check the movement of the body 2, the other valve, that is the valve 13 being closed on any rapid upward movement of said body to perform a similar checking function. There is an advantage in the double control as, for instance, when the body after going down during which it is braked or checked by the closing of the valve 14, starts to move upward, for the valve 13 is caused to close as the valve 14 is caused to open. The movements of these two valves 13 and 14 are so timed that in the present case the valve 13 will be closed before the valve 14 is opened and vice versa. This keeps the braking effect constant during abnormal movements of the body either upward or downward, which would not be the case were a single valve utilized. In the latter event the single valve would have to pass its open position before swinging to the closed or open position as the case might be. Connected with the stems of the valves 13 and 14 are actuators or closing members therefor, the levers 15 and 16 answering satisfactorily in this respect and being suitably connected with the respective valves. The lever 15 is equipped with a weight 17, while the lever 16 has a weight 18 both levers when in their primary positions finding a bearing against the extension 19 of the cylinder 5. As shown the extension 19 is socketed to receive the coiled springs 20 and 21 respectively bearing against the levers 15 and 16 between the fulcrums and free ends thereof, the effects of the springs being to practically exactly counterbalance those of the weights 17 and 18. As the lever 15 as illustrated, is longer than the lever 16 the thrust of the spring 20 is greater than that of the spring 21. The extension 19 is chambered as at 22 and 23 to receive the pistons 24 and 25 respectively, the stems of which are connected with the levers 15 and 16, the chambers 22 and 23 containing suitable liquid in advance of the pistons 24 and 25 from which as will be inferred there is associated with each of the two valve closing levers a dash-pot which in practice tends to prevent too rapid movement of the levers when the part upon which the device is mounted is subjected to unusual vibration, and also to prevent the control valves being actuated when the vibrations of the body are slight, for it should be understood that it is only when the body vibrates for some considerable distance up or down out of its steady forward motion or to vibrate rapidly, that the checking or braking effect is thrown into action.

As will be understood the axle or the running gear of the vehicle can freely move up or down without exerting any checking effect whatsoever upon the body 2. Should the body be subjected to any considerable jar which would move it downward or upward, such movement would be at once automatically checked. Let it be assumed that the body does move downward. When this action takes place the cylinder 5 descends with the body and the lever 16 tends relatively to close the upper valve 14 and thereby arrests the circulation of liquid in the cylinder 5 and thus arrests the movement of the body, the arresting action being a progressive or gradual one. During the movement of the body the valve 13 remains wide open. As the body starts to rise to its predetermined position the valve 14 will open, reaching its wide open position very soon after the body has started upward and at the same time or before the valve 14, has reached its full open position, the valve 13 will be automatically closed, the valve 14 remaining wide open during the upward movement of the body and continuing in such relation until the body again starts downward or the excessive vibrations cease.

In Fig. 2 the body is denoted by 30, the axle by 31 and the spring between the two by 32. In Fig. 1 the construction is all hydraulic, whereas in Fig. 2 it is a combination of hydraulic and electrical, but as will be gathered, there might be structures eminently satisfactory and embodying my invention, where neither hydraulic nor electrical principles were involved. I think it proper to note that in both constructions there is a double control, one control means acting when the body or equivalent part is moving in one direction, and the other when the body or analogous element is moving in the other direction. Although this duplex control is decidedly advantageous, there may be cases where I may not employ it.

Referring again to Fig. 2 the body is provided with a cylinder 33 rigid therewith in which is mounted a piston which with its adjuncts including the stem 34 are exact duplicates of those already described, the stem 34 being connected with the axle 31 precisely as is the stem 7. The cylinder 33 has the by-pass passage 35 the duplicate of the passage 9. The passage 35, however, is intersected by but a single valve as 36 exactly like the valves 13 and 14, the valve 36, however, being governed electrically as by the solenoid 37 constituting a convenient electrical-actuating device for this purpose. The core 38 of the solenoid is connected with the arm 39 fastened suitably to the stem of the valve 36. The port or opening through said valve when the body 30 is in normal relation as illustrated, is in full register with the by-pass passage 35. Fastened to the body 30 are the brackets 40 and 41. To the bracket 40 are connected the superposed contacts 42 and 43 insulated suitably from said bracket 40, the bracket 41 carrying superposed contacts 44 and 45 insulated therefrom. When the contacts 42 and 43 are electrically bridged the solenoid 37 will be energized to close the valve 36 while when the contacts 44 and 45 are electrically bridged, the solenoid 37 will also be energized to close the valve 36 in the opposite direction, all as will hereinafter appear, although I might point out that the first mentioned action occurs on any excessive downward movement of the body, while the other takes place on any excessive upward movement of said body. The body supports the dash-pots 46 and 47, the pistons 48 and 49 of which relatively move oppositely, the movement of the piston 38 being upward from its primary relation while that of the piston 49 is opposite. The stems of the pistons 48 and 49 extend upwardly through the upper heads of the dash-pots and are provided with weights 50 and 51, counterbalanced by the springs 52 and 53 surrounding said stems and bearing against the respective weights. The weight 50 is provided with a circuit closing or bridging member 55, while the weight 51 has a practically similar bridging member 56.

When the body 30 is in what might be called its normal or steady position the bridging member 55 will be against the contact 42 and out of engagement with the contact 43, while the bridging member 56 will be against the contact 44 and free of the contact 45. Should the body abnormally descend the bracket 40 will be drawn downward, so that the bridging member 55 can engage both contacts 42 and 43, whereas should the body rapidly rise, the bridging member 56 will simultaneously engage the contacts 44 and 45 to effect successively the energization of the solenoid 37. The conductor 57 leads from the contact 42 and is connected with one terminal of a suitable source of energy such as the battery 58. The wire 59 extends from the wire 57 between the ends of the latter to the contact 45. From the terminal of the battery 58 opposite that to which the wire 57 is connected, the wire 60 leads and is connected to one terminal of the solenoid 37, the wire 61 leading from the other terminal of the solenoid to the contact 43. Leading from the wire 61 to the contact 44 is the wire 62. It will, therefore, be obvious that when the vehicle body 30 moves downward rapidly or excessively, the bridge piece 55 will cover the gap between the contacts 42 and 43, the solenoid 37 will be energized to attract its core 38 and therefore effect the closing of the valve 36 and the consequent checking and flow of the liquid in the cylinder 33 and thus automatically give a check or braking action to the movement of the body 30. Should the body move upward in like manner, the contacts 44 and 45 will be bridged to effect through the intermediate described parts the closing of the valve 33 and hence the checking in movement of the body.

What I claim is:

1. A shock absorber comprising two movable elements, and separate means both dependent solely upon the movement of one of the elements for checking abnormal movement thereof respectively in different directions.

2. A shock absorber comprising two movable elements, and independently operative means both dependent solely upon the movement of one of said elements, for checking abnormal movement thereof respectively in opposite directions, the other of said elements being inactive on said checking means.

3. A shock absorber comprising two elements connectible with two relatively movable parts, means for checking the movement of said elements on relative movement of the parts in one direction, and means for checking the movement of said parts on their relative movement in the opposite direction, both said checking means being set in action solely by the movement of one of said elements, the other element being inactive upon the checking means.

4. A shock absorber comprising an element, a second element, both elements being movable toward and from each other, two interposed checking means between the elements, the first element on abnormal movement in one direction toward the second element setting one checking means into action to check such movement, and said first element when moving away from the second element setting the other checking means into action to check such second movement, the second element on its movements being inactive upon each of the checking means.

In testimony whereof I affix my signature in presence of two witnesses.

WILLARD T. SEARS.

Witnesses:
DAVID T. NEVIN,
FRANK L. HETTINGS.